(12) United States Patent
Karita et al.

(10) Patent No.: US 11,551,667 B2
(45) Date of Patent: Jan. 10, 2023

(54) LEARNING DEVICE AND METHOD FOR UPDATING A PARAMETER OF A SPEECH RECOGNITION MODEL

(71) Applicant: NIPPON TELEGRAPH AND TELEPHONE CORPORATION, Tokyo (JP)

(72) Inventors: Shigeki Karita, Musashino (JP); Atsunori Ogawa, Musashino (JP); Marc Delcroix, Musashino (JP); Tomohiro Nakatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 204 days.

(21) Appl. No.: 16/963,837

(22) PCT Filed: Feb. 1, 2019

(86) PCT No.: PCT/JP2019/003735
§ 371 (c)(1),
(2) Date: Jul. 22, 2020

(87) PCT Pub. No.: WO2019/151507
PCT Pub. Date: Aug. 8, 2019

(65) Prior Publication Data
US 2021/0056954 A1 Feb. 25, 2021

(30) Foreign Application Priority Data
Feb. 1, 2018 (JP) ............................ JP2018-016195

(51) Int. Cl.
*G10L 15/06* (2013.01)
*G10L 15/02* (2006.01)
*G10L 15/16* (2006.01)

(52) U.S. Cl.
CPC ............ *G10L 15/063* (2013.01); *G10L 15/02* (2013.01); *G10L 15/16* (2013.01)

(58) Field of Classification Search
CPC ..................................................... G10L 15/16
See application file for complete search history.

(56) References Cited

U.S. PATENT DOCUMENTS

| 9,263,036 B1* | 2/2016 | Graves ................. G06N 3/0445 |
| 2018/0151177 A1* | 5/2018 | Gemmeke ........... G10L 15/1822 |
| 2018/0330718 A1* | 11/2018 | Hori ....................... G06N 7/005 |

(Continued)

OTHER PUBLICATIONS

Su, Hang, et al. "Error back propagation for sequence training of context-dependent deep networks for conversational speech transcription." 2013 IEEE International Conference on Acoustics, Speech and Signal Processing. IEEE, 2013. (Year: 2013).*

(Continued)

*Primary Examiner* — Douglas Godbold
(74) *Attorney, Agent, or Firm* — Xsensus LLP

(57) ABSTRACT

A learning device (10) includes a feature extracting unit (11) that extracts features of speech from speech data for training, a probability calculating unit (12) that, on the basis of the features of speech, performs prefix searching using a speech recognition model of which a neural network is representative, and calculates a posterior probability of a recognition character string to obtain a plurality of hypothetical character strings, an error calculating unit (13) that calculates an error by word error rates of the plurality of hypothetical character strings and a correct character string for training, and obtains a parameter for the entire model that minimizes an expected value of summation of loss in the word error rates, and an updating unit (14) that updates a parameter of the model in accordance with the parameter obtained by the error calculating unit (13).

20 Claims, 7 Drawing Sheets

(56) References Cited

U.S. PATENT DOCUMENTS

2019/0189115 A1* 6/2019 Hori ................ G10L 15/183
2020/0090651 A1* 3/2020 Tran ................. G10L 15/22

OTHER PUBLICATIONS

Senior, Andrew, et al. "An empirical study of learning rates in deep neural networks for speech recognition." 2013 IEEE international conference on acoustics, speech and signal processing. IEEE, 2013. (Year: 2013).*

International Search Report and Written Opinion dated May 7, 2019 for PCT/JP2019/003735 filed on Feb. 1, 2019, 8 pages including English Translation of the International Search Report.

Karita, S., et al., "Sequence Training of Encoder-Decoder Model Using Policy Gradient for End-To-End Speech Recognition," 2018 IEEE International Conference on Acoustics, Speech and Signal Processing (ICASSP), 2018, pp. 5839-5843.

Prabhavalkar, R., et al., "Minimum Word Error Rate Training for Attention-Based Sequence-To-Sequence Models," Dec. 5, 2017, 5 pages.

G.Hinton et al., "Deep Neural Networks for Acoustic Modeling in Speech Recognition", IEEE Signal Processing Magazine, vol. 29, No. 6, 2012, pp. 82-97.

J.Chorowski et al., "Attention-Based Models for Speech Recognition", Advances in Neural Information Processing Systems 28, 2015, pp. 577-585.

S. Karita et al., "Encoder Decoder Speech Recognition Based on Minimizing Expected Word Error Rate", A collection of lecture papers presented at the 2018 Spring Conference of the Acoustic Society of Japan, Feb. 27, 2018, pp. 17-20.

* cited by examiner

LEARNING DEVICE AND METHOD FOR UPDATING A PARAMETER OF A SPEECH RECOGNITION MODEL

CROSS-REFERENCE TO RELATED APPLICATIONS

The present application is based on PCT filing PCT/JP2019/003735, filed Feb. 1, 2019, which claims priority to JP 2018-016195, filed Feb. 1, 2018, the entire contents of each are incorporated herein by reference.

TECHNICAL FIELD

The present invention relates to a learning device, a learning method, and a learning program.

BACKGROUND ART

Conventionally, there has been proposed a speech recognition device based on the Hidden Markov Model (HMM) (e.g., see NPL 1). This speech recognition device based on HMM employs a hierarchical structure, and accordingly has not been able to learn a corelative relation between speech features and character strings at the same time.

With regard to this, a speech recognition device that is capable of directly learning a corelative relation between speech and character strings of different lengths on the basis of an encoder-decoder has been proposed as of recent (e.g., see NPL 2). This speech recognition device employs an encoder-decoder, which is a type of neural network (NN) as a model. Thus, according to the speech recognition device, a corelative relation between speech and character strings of different lengths can be learned at the same time, and highly-precise speech recognition can be realized with a simpler configuration.

CITATION LIST

Non Patent Literature

[NPL 1] G. Hinton et al., "Deep Neural Networks for Acoustic Modeling in Speech Recognition", IEEE SIGNAL PROCESSING MAGAZINE, Vol. 29, No. 6, pp. 82-97, 2012. (https://static.googleusercontent.com/media/research.google.com/ja//pubs/archive/38131.pdf)

[NPL 2] J. Chorowski et al., "Attention-Based Models for Speech Recognition", Advances in Neural Information Processing Systems 28 (NIPS 2015), pp. 577-585, 2015. (http://papers.nips.cc/paper/5847-attention-based-models-for-speech-recognition.pdf)

SUMMARY OF THE INVENTION

Technical Problem

However, the speech recognition model based on NN in NPL 2 uses different indicators and processing operations for learning and recognition, and accordingly there has been a limit in improvement of precision.

The present invention has been made in light of the above circumstances, and accordingly it is an object thereof to provide a learning device, a learning method, and a learning program, capable of executing learning of speech recognition models based on NN, in a highly precise manner.

Means for Solving the Problem

In order to solve the above-described problem and achieve the object, a learning device according to the present invention includes an extracting unit that, on the basis of the features of speech, extracts features of speech from speech data for training, a probability calculating unit that performs prefix searching using a speech recognition model of which a neural network is representative, and calculates a posterior probability of a recognition character string to obtain a plurality of hypothetical character strings, an error calculating unit that calculates an error by word error rates of the plurality of hypothetical character strings and a correct character string for training, and obtains a parameter for the entire speech recognition model that minimizes an expected value of summation of loss in the word error rates, and an updating unit that updates a parameter of the speech recognition model in accordance with the parameter obtained by the error calculating unit.

Effects of the Invention

According to the present invention, learning of speech recognition models based on NN can be executed in a highly precise manner.

DESCRIPTION OF EMBODIMENTS

An embodiment of a learning device, a learning method, and a learning program according to the present application will be described in detail below with reference to the Figures. Note that the present invention will be described with regard to an example of training a speech recognition model, where a corelative relation of speech features and character strings has been modeled by encoder-decoder, using speech data for training. Also, the present invention is not restricted by the embodiment described below.

Note that hereinafter, in a case where a is a vector, for example, this will be written as "vector a", in a case where A is a matrix, for example, this will be written as "matrix A", and in a case where A is a scalar, for example, this will be written simply as "A". Also, in a case where A is a set, for example, this will be written as "set A". Also, a function f that has a scalar a as an argument, for example, will be written as f(vector a). Also, in a case where A which is a vector, matrix, or scalar is written as "^A", this is equivalent to "a symbol where '^' is written directly above 'A'". Also, in a case where A which is a vector, matrix, or scalar is written as "~A", this is equivalent to "a symbol where '~' is written directly above 'A'". Note that features and character strings are represented by vectors.

[Configuration of Learning Device]

Figure 1:
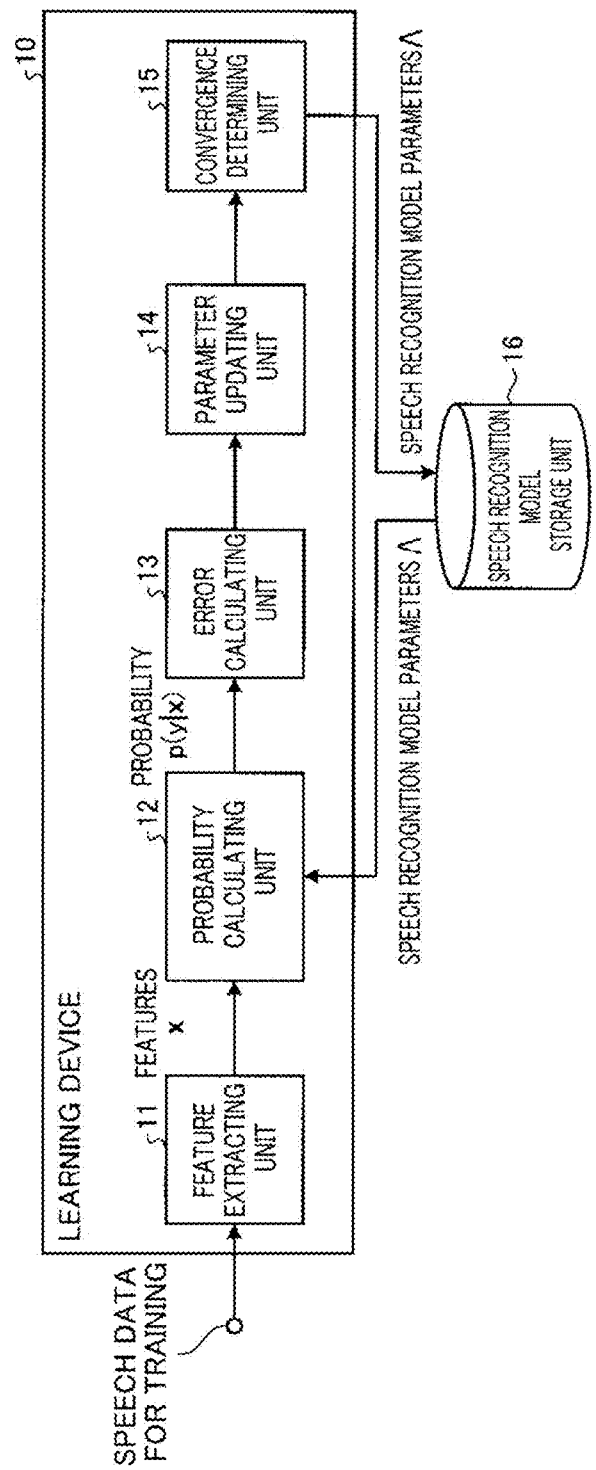
FIG. 1 is a diagram illustrating an example of a configuration of a learning device according to an embodiment.

First, a configuration of a learning device according to the embodiment will be described with reference to FIG. 1. FIG. 1 is a diagram illustrating an example of a configuration of the learning device according to the embodiment. The learning device 10 according to the embodiment is realized by a predetermined program being read by a computer or the like including, for example, ROM (Read Only Memory), RAM (Random Access Memory), a CPU (Central Processing Unit), and so forth, and the CPU executing the predetermined program. The learning device 10 includes a feature extracting unit 11 (extracting unit), a probability calculating unit 12, an error calculating unit 13, a parameter updating unit 14 (updating unit), a convergence determining unit 15, and a speech recognition model storage unit 16, as illustrated in FIG. 1.

The speech recognition model storage unit 16 stores a speech recognition model where acoustic features of speech have been modeled. The speech recognition model is expressed by a NN. The speech recognition model includes a posterior probability distribution for each state of the HMM calculated by the NN. The speech recognition model is obtained by modelling a corelative relation between acoustic features of speech and character strings by the encoder-decoder. Specifically, the speech recognition model storage unit 18 stores a speech recognition model parameter set A that is parameters of the NN.

The feature extracting unit 11 reads in speech data for training that has been input, and extracts features of the speech from the speech data for training. The feature extracting unit 11 extracts, for example, MFCC (Mel Frequency Cepstral Coefficient), FBANK (Log Mel Filterbank Coefficients), ΔMFCC (first derivative of MFCC), ΔΔMFCC (second derivative of MFCC), logarithmic power, Δlogarithmic power (first derivative of logarithmic power), and so forth, as features. The feature extracting unit 11 extracts a feature vector x from the speech data for training as a speech feature.

The probability calculating unit 12 uses the feature vector x extracted by the feature extracting unit 11 and the speech recognition model parameter set A stored in the speech recognition model storage unit 16 to calculate a probability p(y|x) of a recognition character string on the basis of NN-HMM. On the basis of the speech features, the probability calculating unit 12 performs prefix searching using the speech recognition model, and calculates the posterior probability of the recognition character string. The probability calculating unit 12 then selects a hypothesis where the likelihood of correct character string is the greatest. As a hypothesis where the likelihood of correct character string is the greatest, the probability calculating unit 12 obtains a count M (M≥2) of hypothetical character strings that are K in length. In this case, the probability calculating unit 12 selects a character candidate following the prefix that is the object of the search, on the basis of polynomial distribution according to co-occurrence probability of the character candidate following the prefix that is the object of the search. The probability calculating unit 12 calculates the probability of no correct character string.

The error calculating unit 13 performs error calculation by word error rate on the basis of the posterior probability calculated by the probability calculating unit 12, and obtains parameters for the entire model. The error calculating unit 13 performs error calculation by word error rate for M hypothetical character strings, and a correct character string for training that is T in length, and obtains parameters for the entire model that minimize the expected value for the summation of word error rate losses. In this case, the error calculating unit 13 obtains parameters for the entire model by backpropagation, on the basis of word error rate loss and policy gradient where the gradient of loss has been approximated. The length K of the hypothetical character string and the length T of the character string for training may be different lengths, or may be the same length.

The parameter updating unit 14 updates the speech recognition model parameter set Λ in accordance with the parameters obtained by the error calculating unit 13.

The convergence determining unit 15 determines whether or not the speech recognition model parameter set Λ has converged by updating. In a case of the convergence determining unit 15 determining that the speech recognition model parameter set Λ has converged, learning of the speech data for training that has been input ends. Next, the updated speech recognition model parameter set Λ is stored in the speech recognition model storage unit 16. In a case of the convergence determining unit 15 determining that the speech recognition model parameter set Λ has not converged, the probability calculating unit 12, error calculating unit 13, and parameter updating unit 14 use the updated speech recognition model parameter set Λ to perform further calculation of posterior probability, error calculation, and updating of the speech recognition model parameter set A.

Thus, the learning device 10 according to the present embodiment performs error calculation by prefix searching and word error rate, as probability calculation and error calculation, and updates parameters of the speech recognition model.

[Conventional Learning Device]

Conventional learning devices perform probability calculation by correct character string, and error calculation by cross-entropy loss using the probability of the correct character string, as probability calculation and error calculation. Now, the probability calculation processing and error calculation processing in a conventional learning device will be described. In other words, in conventional learning devices, error calculation is performed by approximating word error rate loss to cross-entropy loss using probability in a correct character string.

Figure 2:
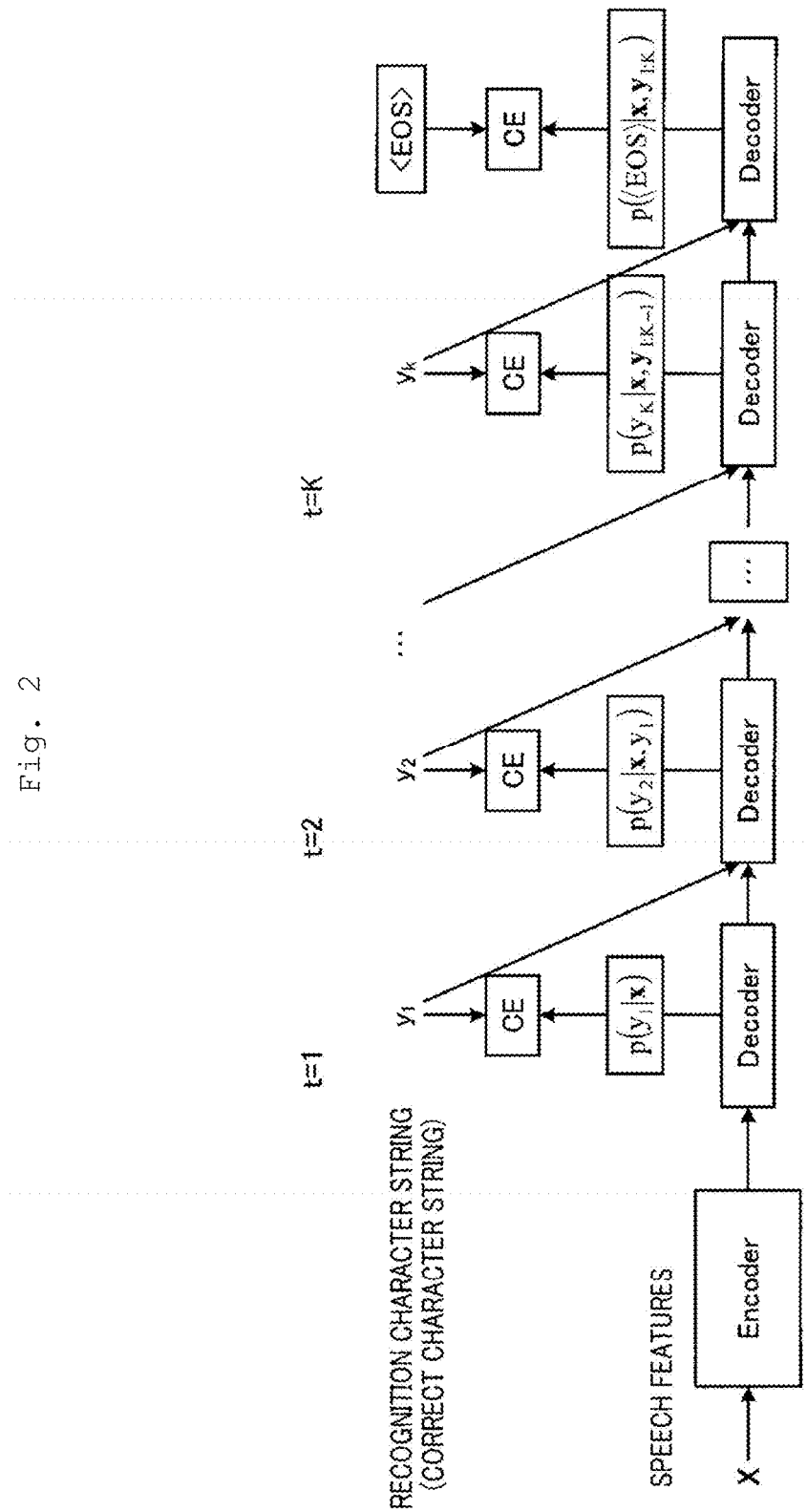
FIG. 2 is a diagram for describing conventional probability calculation processing and error calculation processing.

FIG. 2 is a diagram for describing conventional probability calculation processing and error calculation processing. The conventional learning device uses an encoder-decoder model that has two partial neural networks representing Encoder and Decoder, as illustrated in FIG. 2. In probability calculation processing of a recognition character string, the conventional learning device calculates the probability p(y|x) of a recognition character string regarding the feature vector x in input speech matching a correct character string $y=y_1, y_1, \ldots, y_T$ that is T in length, by the encoder-decoder model illustrated in FIG. 2, using the following Formula (1) through Formula (4).

[Formula 1]

$$e = \text{Encoder}(x) \quad (1)$$

[Formula 2]

$$s_0 = 0 \quad (2)$$

[Formula 3]

$$[P(y_t|y_{1:t-1},x), s_t] = \text{Decoder}(y_{t-1}, e, s_{t-1}), (t=1,2,\ldots,T) \quad (3)$$

[Formula 4]

$$P(y|x) = \Pi_{t=1}^{T} P(y_t|y_{1:t-1}, x) \quad (4)$$

e is an intermediate vector by the input-side neural network Encoder, and $s_t$ is an intermediate vector accompanying a t'th output character by the output-side neural network Decoder.

Next, the conventional learning device performs error calculation by cross-entropy loss using probability in the correct character string. In the error calculation processing, the conventional learning device obtains the gradient of parameters of the entire encoder-decoder model by common backpropagation so as to minimize the cross-entropy loss shown in Formula (5) using probability in a correct character string, and advances to parameter updating processing.

[Formula 5]

$$J_{CE} = -\log P(y|x) \quad (5)$$

[Probability Calculation Processing and Error Calculation Processing According to Present Embodiment]

Figure 3:
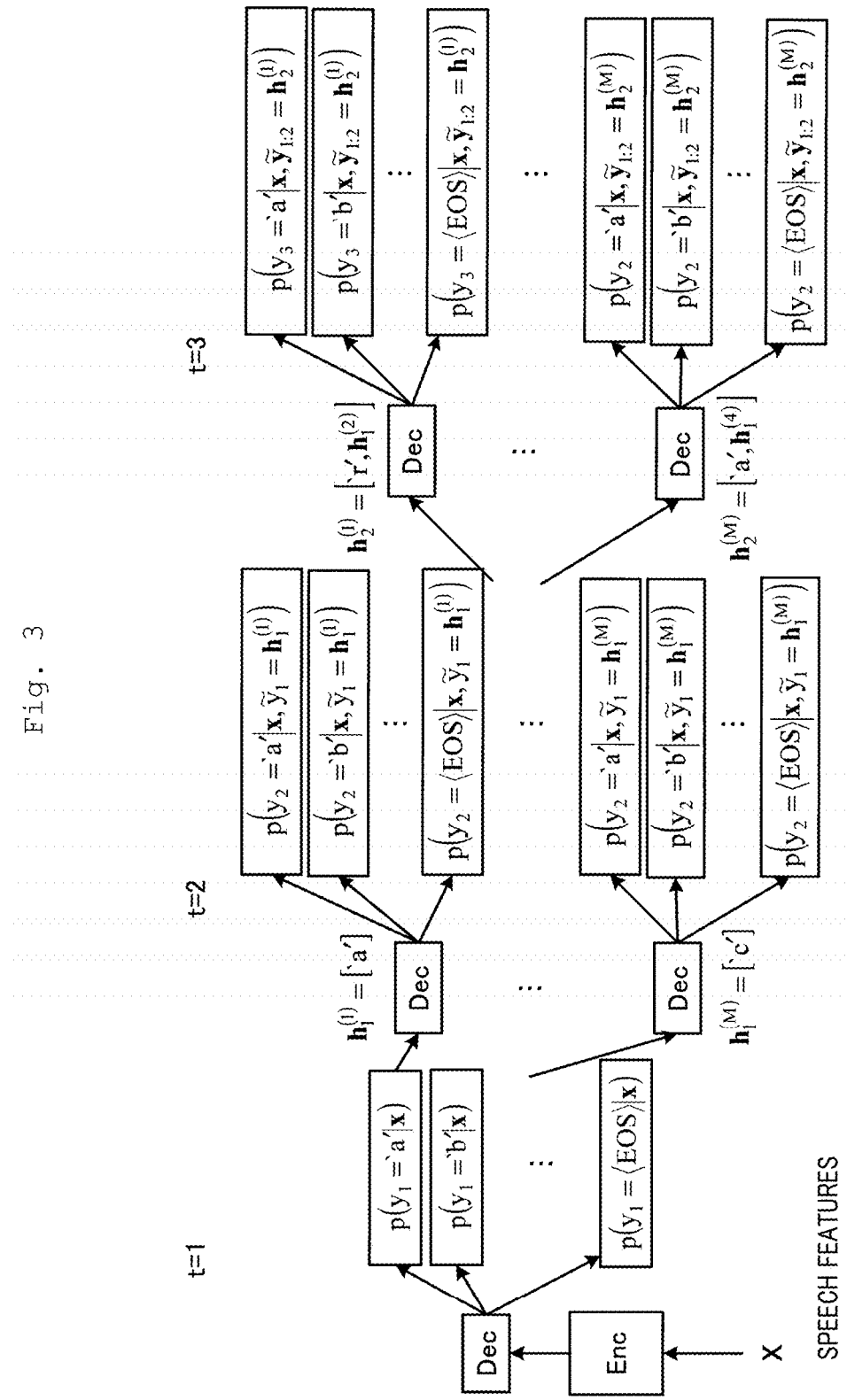
FIG. 3 is a diagram for describing probability calculation processing and error calculation processing according to the learning device illustrated in FIG. 1.

Next, probability calculation processing and error calculation processing by the learning device 10 will be described. FIG. 3 is a diagram for describing probability calculation processing and error calculation processing by the learning device 10 illustrated in FIG. 1.

In probability calculation processing of a recognition character string, the learning device 10 performs probability calculation of the recognition character string by prefix searching in the same way as when performing recognition, without using a correct character string as in conventional learning, in order to prevent overtraining with regard to the speech data for training. That is to say, the learning device 10 obtains a hypothesis ^y where the likelihood of correct character string p(y=^y|x) is greatest by prefix searching and so forth, in the same way as with probability calculation when performing recognition without a correct character string.

Prefix vector $h_t^{(m)}$ is a character string where the 1st through t-1'th characters in the hypothesis of the m'th (m=1, 2, ..., M) search object are arrayed. First, the probability calculating unit 12 obtains the co-occurrence probability $\pi_{m,y_t}$ of the character candidate $y_t$ following the prefix $h_t^{(m)}$ that is the object of searching, using the following Formula (6) through Formula (8).

[Formula 6]

$$[P(y_t \mid x, h_t^{(m)}), s_t^{(m)}] = \text{Decoder}(y_{t-1}^{(m)}, e, s_{t-1}^{(m)}), (m = 1, 2, \ldots, M) \quad (6)$$

[Formula 7]

$$P(y_t, h_t^{(m)} \mid x) = P(y_t \mid x, h_t^{(m)}) P(h_t^{(m)} \mid x) \quad (7)$$

[Formula 8]

$$\pi_{m,y_t} = \frac{P(y_t, h_t^{(m)} \mid x)}{\sum_{m=1}^{M} \sum_{y_t} P(y_t, h_t^{(m)} \mid x)}, y_t \in Y \quad (8)$$

Set Y is a set of characters (alphabet letters, numerals, terminal symbols, etc.) used for recognition.

The probability calculating unit 12 samples a search object prefix vector $h_{t+1}^{(m)}$ to which a t'th character has been newly added, from the polynomial distribution following the occurrence probability $\pi_{m,y_t}$, using Formula (9) and Formula (10).

[Formula 9]

$$[h_t^{(l)}, y_t^{(m)}] \sim \text{Mult}(\pi), (l=1,2,\ldots,M) \quad (9)$$

[Formula 10]

$$h_{t+1}^{(m)} = \text{append}(h_t^{(l)}, y_t^{(m)}) \quad (10)$$

append is to output what is obtained by connecting $y_t^{(m)}$ as the t'th character to the character string (prefix) $h_t^{(l)}$ smaller than the t'th in an l'th hypothetical character string, as a new character string (prefix) $h_{t+1}^{(m)}$ smaller than the t+1'th in a m'th hypothetical character string. For example, the probability calculating unit 12 samples characters that are in the top 20 in occurrence frequency out of the polynomial distribution following the occurrence probability $\pi_{m,y_t}$, i.e., the top 20 characters of which the frequency of appearing as a next character is taken to be high, as a prefix vector $h_{t+1}^{(m)}$ to be newly added.

The probability calculating unit 12 then newly obtains a probability value to be used for calculation of the occurrence probability $\pi_{m,y_t}$ in a hypothesis including the next t+1'th character, from the sampled $y_t^{(m)}$, using Formula (11).

[Formula 11]

$$P(h_{t+1}^{(m)} \mid x) = P(y_t = y_t^{(m)} \mid h_t^{(m)}, x) P(h_t^{(m)} \mid x) \quad (11)$$

The probability calculating unit 12 repeats the above processing while increasing t until M samples include a terminal symbol (EOS), thereby obtaining M hypothetical character strings ~y that are K in length to the terminal symbol, and that have been selected probabilistically. The character strings ~y are expressed by Formula (12).

[Formula 12]

$$\tilde{y} \in \{h^{(m)}\}_{m=1}^{M} \quad (12)$$

The error calculating unit 13 performs error calculation by word error rate regarding the M hypothetical character strings ~y output by the probability calculating unit 12 and a correct character string vector y of a length T for training. The word error rate is a scalar value, and it is difficult to perform learning using errors in scalar values in serial learning such as speech recognition. Accordingly, the error calculating unit 13 uses the word error rate of individual characters in the character string as a series.

In this case, the dynamic design matrix regarding the word error rate in a case where the length of the hypothetical character strings ~y is K is shown in Formula (13).

[Formula 13]

$$C^{y,\tilde{y}} \in R^{T \times K} \quad (13)$$

The error calculating unit 13 obtains the dynamic design matrix regarding the word error rate in a case where the length of the hypothetical character strings ~y is K, using Formula (14) through Formula (16).

[Formula 14]

$$C_{t,0}^{y,\tilde{y}} = t, (t = 0, 1, \ldots, T) \quad (14)$$

[Formula 15]

$$C_{0,k}^{y,\tilde{y}} = k, (k = 0, 1, \ldots K) \quad (15)$$

[Formula 16]

$$C_{t,k}^{y,\tilde{y}} = \min(C_{t,k-1}^{y,\tilde{y}} + 1, C_{t-1,k}^{y,\tilde{y}} + 1, C_{t,k}^{y,\tilde{y}} + \delta_{t,k}^{y,\tilde{y}}), \quad (16)$$
$$(t = 1, 2, \ldots, T, k = 1, \ldots, K)$$

Where $$\delta_{t,k}^{y,\tilde{y}} = \begin{cases} 2, & \tilde{y}_k = y_t \\ 0, & \tilde{y}_k \neq y_t \end{cases}$$

Formula (17) shows the final word error count.

[Formula 17]

$$C_{T,K}^{y,\tilde{y}} \quad (17)$$

The error calculating unit 13 obtains a degree of update of the parameter set Λ for the entire model by backpropagation starting from a gradient regarding a loss parameter, so as to minimize loss in the summation of word error rates at each k'th (k=1, 2, . . . , K) character $\tilde{y}_k$ in the hypothetical character string $\tilde{~}A$ using a set of smallest elements in (t, k) selected by a min operation that makes up the final word error count. The error calculating unit 13 outputs the degree of update of the parameter set that has been obtained to the parameter updating unit 14. The set of smallest elements is shown in Formula (18). The loss in summation of word error rates is shown in Formula (19).

[Formula 18]

$$\widehat{C^{y,\tilde{y}}} = \{C_{T,K}^{y,\tilde{y}}, \ldots, C_{0,0}^{y,\tilde{y}}\} \quad (18)$$

[Formula 19]

$$J_{PG}(\tilde{y}) = \sum_{k=1}^{K} C_{\hat{t}(k),k}^{y,\tilde{y}} / \hat{t}(k)$$

Where $$\hat{t}(k) = \operatorname{argmin}_t \{C_{t,k}^{y,\tilde{y}} | C_{t,k}^{y,\tilde{y}} \in \widehat{C^{y,\tilde{y}}}\} \quad (19)$$

Now, a general analytical solution of gradients regarding parameter of loss calculated by word error rate is not self-evident. That is to say, loss calculated by word error rate is not differentiable regarding parameters, and accordingly an analytical gradient regarding parameters cannot be derived. Also, gradients propagated in backpropagation are not limited to analytical gradients. Accordingly, a policy gradient regarding the parameter set Λ of the speech recognition model obtained from the hypothetical character string $h^{(m)}$ (m=1, 2, . . . , M) which the above sampling operation yields, is used by the error calculating unit 13 as a numerical approximation of a gradient of loss that cannot be analytically derived. The policy gradient is shown in Formula 20.

[Formula 20]

$$\frac{\partial}{\partial \Lambda} J_{PG} \approx \frac{1}{M} \sum_{m=1}^{M} J_{PG}(\tilde{y} = h^{(m)}) \quad (20)$$

Thus, in probability calculation processing of a recognition character string the learning device 10 performs probability calculation of the recognition character string by prefix searching, in the same way as when performing recognition. Then in error calculation processing, the learning device 10 obtains the parameter set Λ of the entire speech recognition model by backpropagation, on the basis of loss in the word error rate, and the policy gradient approximating the gradient of loss.

[Configuration of Speech Recognition Device]

Figure 4:
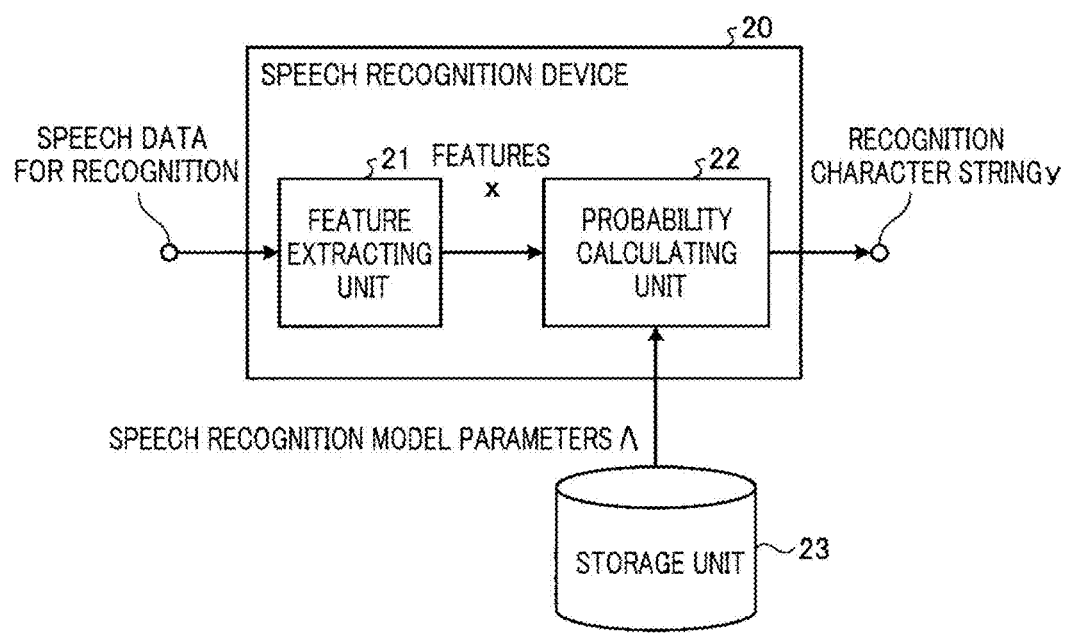
FIG. 4 is a diagram illustrating an example of a configuration of a speech recognition device according to the embodiment.

Next, the configuration of a speech recognition device according to the present embodiment will be described with reference to FIG. 4. FIG. 4 is a diagram illustrating an example of the configuration of the speech recognition device according to the embodiment. The speech recognition device 20 has a feature extracting unit 21, a probability calculating unit 22, and a storage unit 23, as illustrated in FIG. 4.

The storage unit 23 stores a speech recognition model. Specifically, the storage unit 23 stores the speech recognition model parameter set Λ that has been trained by the learning device 10.

The feature extracting unit 21 reads in speech data for recognition that has been input, and extracts features of speech from the speech data for recognition. The feature extracting unit 11 performs processing the same as that of the feature extracting unit 11 of the learning device 10. Note however, that speech data for recognition is input to the feature extracting unit 21.

The probability calculating unit 22 calculates the probability p(y|x) of the recognition character string on the basis of speech features extracted by the feature extracting unit 21 and the speech recognition model parameter set Λ stored in the speech recognition model storage unit 16. The probability calculating unit 22 outputs a character string y that has the highest probability of the calculated probabilities as recognition results.

[Learning Processing]

Figure 5:
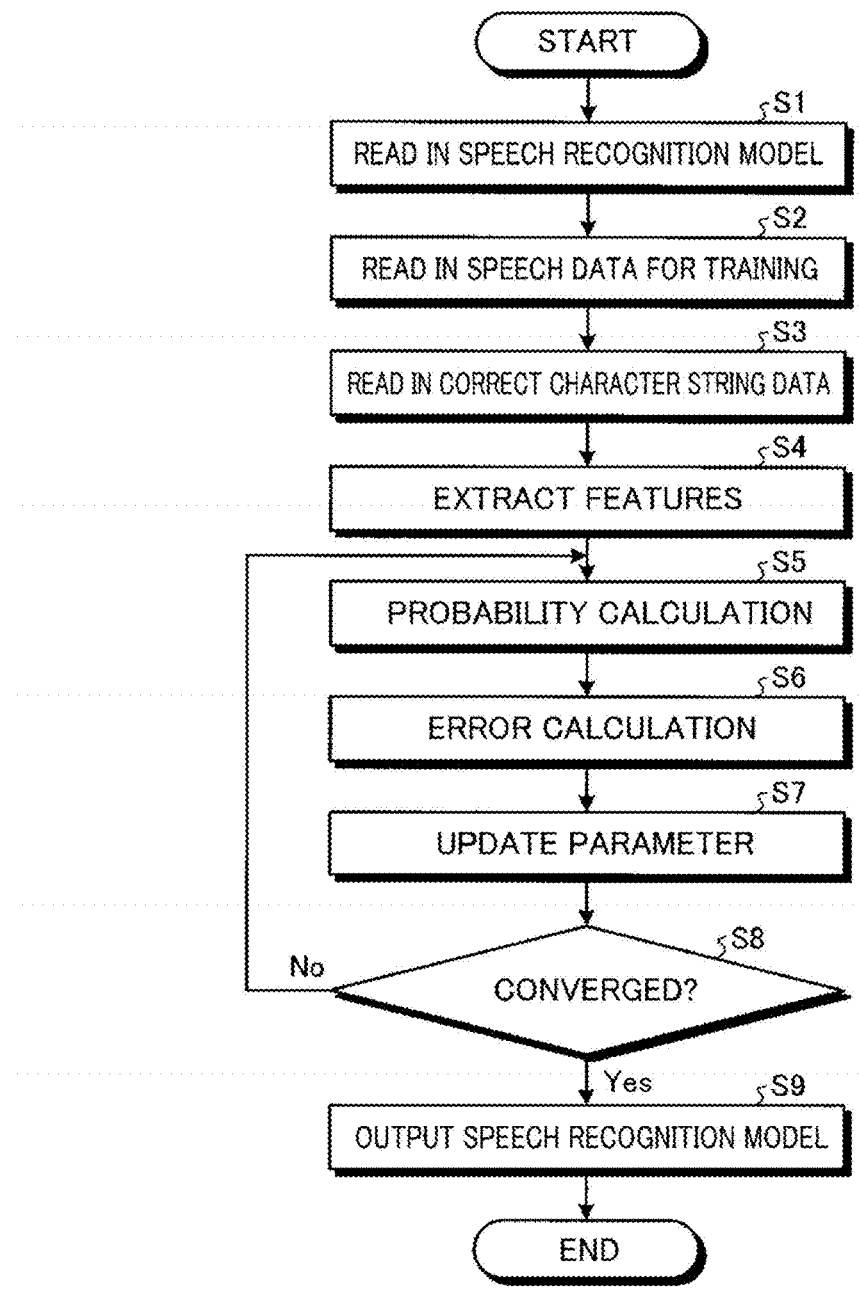
FIG. 5 is a flowchart illustrating processing procedures for learning processing according to the embodiment.

The flow of processing at the learning device 10 will be described with reference to FIG. 5. FIG. 5 is a flowchart illustrating processing procedures regarding learning processing according to the embodiment. First, the learning device 10 reads in a speech recognition model (step S1), as illustrated in FIG. 5. Specifically, at this time the learning device 10 reads in the speech recognition model parameter set Λ from the speech recognition model storage unit 16. Next, the learning device 10 reads in speech data for training (step S2). The learning device 10 then reads in correct character string data corresponding to the speech data for training that has been read in (step S3). This correct character string data is used at the time of obtaining the word error rate in later-described error calculation processing (step S6).

The feature extracting unit 11 extracts features from the speech data for training (step S4). The probability calculating unit 12 then performs prefix searching using the speech recognition model, on the basis of features of speech, calculates a posterior probability of the recognition character string, and performs probability calculation processing where M (M≥2) hypothetical character strings, K in length, are obtained (step S5).

The error calculating unit 13 performs error calculation where error is calculated by word error rate between the M hypothetical character strings and the correct character string for training that has a length of T, and parameters for the entire speech recognition model that minimize the expected value of summation of loss in the word error rates are obtained (step S6). The parameter updating unit 14 updates the parameters of the speech recognition model in accordance with the parameters obtained by the error calculating unit 13 (step S7).

The convergence determining unit 15 determines whether the speech recognition model parameter set Λ has converged or not (step S8). In a case where determination is not made by the convergence determining unit 15 that the speech recognition model parameter set Λ has converged (step S8, No), the learning device 10 repeats step S5 through step S7.

Conversely, in a case where determination is made by the convergence determining unit 15 that the speech recognition model parameter set Λ has converged (step S8, Yes), the learning device 10 outputs the speech recognition model parameter set Λ (step S9). At this time, the learning device 10 stores the updated speech recognition model parameter set Λ in the storage unit 23 of the speech recognition device 20, for example.

[Processing at Speech Recognition Device According to Embodiment]

Figure 6:
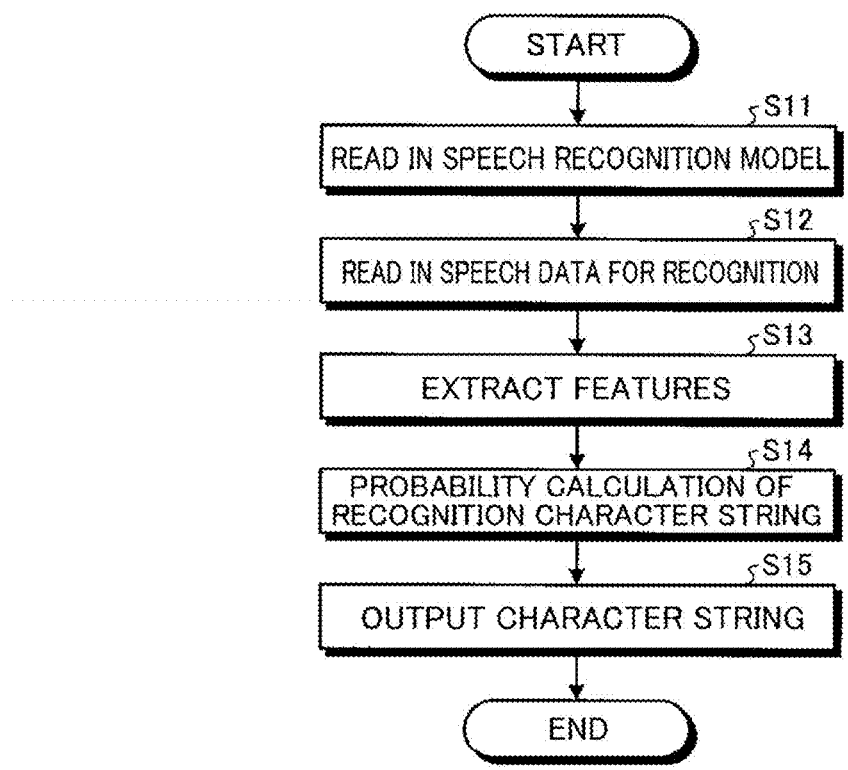
FIG. 6 is a flowchart illustrating the flow of processing of a speech recognition device according to the embodiment.

The flow of processing at the speech recognition device 20 will be described with reference to FIG. 6. FIG. 6 is a flowchart illustrating the flow of processing at the speech recognition device according to the embodiment. First, the speech recognition device 20 reads in a speech recognition model (step S11), as illustrated in FIG. 6. Specifically, at this time the speech recognition device 20 reads in the trained speech recognition model parameter set Λ from the storage unit 23. The speech recognition device 20 then reads in speech data for recognition (step S12).

The feature extracting unit 21 extracts features from the speech data for recognition (step S13). The probability calculating unit 22 then calculates a posterior probability $p(y|x)$ of the recognition character string on the basis of the speech features extracted by the feature extracting unit 21 and the speech recognition model parameter set Λ stored in the speech recognition model storage unit 18 (step S14). The probability calculating unit 22 outputs a character string y that has the highest probability of the calculated probabilities as recognition results (step S15).

Effects of Embodiments

Thus, the learning device 10 according to the present embodiment has an encoder-decoder structure, and at the time of processing uses a model that performs probability calculation processing of a recognition character string by prefix searching, and error calculation processing by word error rate.

Now, the learning device 10 performs probability calculation in a state where there is no correct character string, in the same way as when recognizing.

That is to say, the learning device 10 performs probability calculation by selecting character candidates following a prefix that is the object of searching, on the basis of polynomial distribution in accordance with the co-occurrence probability of a character candidate following a prefix that is the object of searching. Accordingly, the processing of probability calculation of recognition character strings is the same for when learning and when recognizing in the present embodiment.

The learning device 10 enables learning where the word error rate, which is an evaluation indicator used when recognizing, is efficiently minimized, by obtaining parameters for the entire model by backpropagation, on the basis of loss in word error rate, and a policy gradient approximating the gradient of loss. That is to say, according to the present embodiment, word error rate in increments of sentences is used as an indicator for both learning errors and recognition errors. Conversely conventional learning devices have not been able to learn with assumptions the same as when recognizing.

Thus, according to the learning device 10 of the present embodiment, model parameters can be optimized by performing learning where assumptions the same as when recognizing are applied, and learning of a speech recognition model based on an NN can be executed with high precision.

[Evaluation Results]

Table 1 shows experiment results where speech recognition precision according to the present embodiment and speech recognition precision according to the conventional art were evaluated. In this evaluation, a speech recognition model trained using the learning device 10 according to the present embodiment that performs error searching by prefix searching and word error rate, and a speech recognition model that performs learning according to the conventional art where probability calculation by correct character string and error calculation by cross-entropy loss is performed, were compared.

TABLE 1

|  | Word Error Rate (%) |
| --- | --- |
| Conventional art (probability calculation by correct character string and error calculation by cross-entropy loss) | 41.9 |
| Embodiment (Error calculation by prefix searching and word error rate) | 38.6 |

As for experiment conditions, features of input speech were 40-dimension FBANK+ΔFBANK+ΔΔFBANK. That is to say, as for experiment conditions, features input to the encoder-decoder were in input increments of 40×3=120 pieces. Also, as for experiment conditions, features were normalized using a normalized parameters of a mean-variance model calculated using a dataset of speech data for training. Also, as for experiment conditions, the Stochastic Gradient Descent in learning was a learning rate of 0.001, and eight speeches to be processed in parallel.

As shown in Table 1, the word error rate according to the present embodiment was lower than the word error rate according to the conventional art. Thus, it can be said that the speech recognition device 20 using the speech recognition model according to the present embodiment has higher performance than the conventional art.

Also, the present embodiment is capable not only of speech recognition, but also is applicable to various types of pattern recognition where features are extracted from input data and classification is performed of the input data into classes defined beforehand on the basis of the features. In the present embodiment, model parameters can be optimized by performing learning where assumptions the same as when recognizing are applied, and accordingly the precision of class classification can be improved in pattern recognition for classifying into classes.

[System Configuration, Etc.]

The components of the devices illustrated in the Figures are functionally conceptual, and are not necessarily physically configured as illustrated in the Figures. That is to say, specific forms of dispersion/integration of the devices are not limited to those illustrated in the Figures, and all or part may be configured functionally or physically dispersed/integrated in optional increments in accordance with various types of loads, usage conditions, and so forth. Further, all or an optional part of the processing functions carried out at each device may be realized by a CPU and a program executed for analysis by the CPU, or alternatively may be realized as hardware through wired logic.

Also, of the processes described in the present embodiment, all or part of processes described as being automatically performed can be manually performed. Alternatively, all or part of processes described as being manually performed can be automatically performed by known methods. Moreover, processing procedures, control procedures, specific names, and information including various types of data and parameters, shown in the above document and drawings, can be optionally changed unless specifically stated otherwise. That is to say, the processing described regarding the above learning method and speech recognition method is not limited to being executed in time sequence following the described order, and may be executed in parallel or individually, in accordance with the processing capabilities of the device executing the processing, or as necessary.

[Program]

Figure 7:
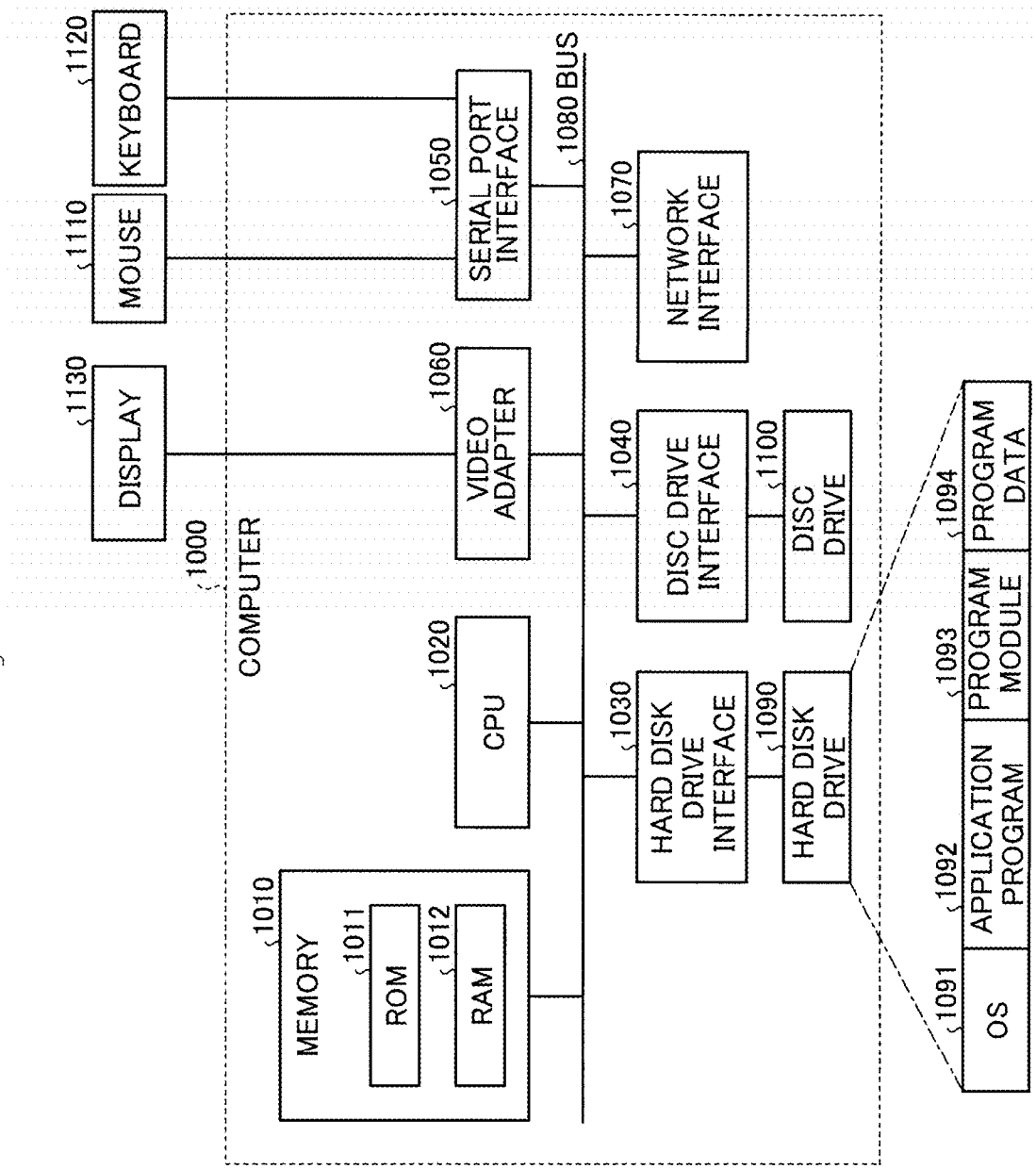
FIG. 7 is a diagram illustrating an example of a computer where the learning device or speech recognition device is realized by executing a program.

FIG. 7 is a diagram illustrating an example of a computer on which the learning device 10 or speech recognition device 20 is realized by a program being executed. A computer 1000 has memory 1010 and a CPU 1020, for example. The computer 1000 also has a hard disk drive interface 1030, a disc drive interface 1040, a serial port interface 1050, a video adapter 1060, and a network interface 1070. These parts are connected by a bus 1080.

The memory 1010 includes ROM 1011 and RAM 1012. The ROM 1011 stores a boot program such as a BIOS (Basic Input Output System), for example. The hard disk drive interface 1030 is connected to a hard disk drive 1031. The disc drive interface 1040 is connected to a disc drive 1100. A detachable storage medium such as a magnetic disk or optical disc or the like, for example, is inserted to the disc drive 1100. The serial port interface 1050 is connected to, for example, a mouse 1110 and keyboard 1120. The video adapter 1060 is connected to a display 1130, for example.

The hard disk drive 1031 stores, for example, an OS 1091, an application program 1092, a program module 1093, and program data 1094. That is to say, a program that defines each processing of the learning device 10 or speech recognition device 20 is implemented as a program module 1093 in which code that is executable by the computer 1000 is described. The program module 1093 is stored in the hard disk drive 1031, for example. A program module 1093 for executing processing the same as the functional configurations of the learning device 10 or speech recognition device 20, for example, is stored in the hard disk drive 1031. Note that an SSD (Solid State Drive) may substitute for the hard disk drive 1031.

Also, settings data used in processing in the above-described embodiment is stored in the memory 1010 or hard disk drive 1031, for example, as the program data 1094. The CPU 1020 reads the program module 1093 and program data 1094 stored in the memory 1010 or hard disk drive 1031 to the RAM 1012 as necessary, and performs execution thereof.

Note that the program module 1093 and program data 1094 is not limited to a case of being stored in the hard disk drive 1031, and may be stored in a detachable storage medium for example, and be read out by the CPU 1020 via the disk drive 1100 or the like. Alternatively, the program module 1093 and program data 1094 may be stored in another computer connected via a network (LAN (Local Area Network), WAN (Wide Area Network), etc.). The program module 1093 and program data 1094 may be read out from the other computer by the CPU 1020 via the network interface 1070.

An embodiment to which an invention made by the present inventor has been applied has been described above, but the present invention is not limited by the description and Figures making up a part of the disclosure of the present invention by way of embodiment. That is to say, other embodiments, examples, operational technology, and so forth, made by one skilled in the art or the like on the basis of the present embodiment are all encompassed by the scope of the present invention.

REFERENCE SIGNS LIST

10 Learning device
11, 21 Feature extracting unit
12, 22 Probability calculating unit
13 Error calculating unit
14 Parameter updating unit
15 Convergence determining unit
16 Speech recognition model storage unit
20 Speech recognition device
23 Storage unit

The invention claimed is:

1. A learning device, comprising:
extracting circuitry that extracts features of speech from speech data for training;
probability calculating circuitry that, based on the features of speech,
performs prefix searching using a speech recognition model of which a neural network is representative, and
calculates a posterior probability of a recognition character string to obtain a plurality of hypothetical character strings;
error calculating circuitry that
calculates an error by word error rates of the pluralih of hypothetical character strings and a correct character string for training, and
obtains a degree of update of a parameter set for an entirety of the speech recognition model by backpropagation, based on a loss in word error rate and a policy gradient approximating a gradient of loss, the entirety of the speech recognition model minimizing an expected value of summation of loss in the word error rates; and
updating circuitry that updates a parameter of the speech recognition model in accordance with the degree of update of the parameter set obtained by the error calculating circuitry, wherein
the policy gradient is defined by the following formula:

$$\frac{\partial}{\partial \Lambda} J_{PG} = \frac{1}{M} \sum_{m=1}^{M} J_{PG}(\hat{y} = h^{(m)}),$$

where
$\Lambda$ is the parameter set,
$J_{PG}$ is the summation of loss in word error rates,
M is a total number of the plurality of hypothetical character strings,
y is a hypothetical character string, and
$h^{(m)}$(m=1, 2, . . . M) are the plurality of hypothetical character strings.

2. The learning device according to claim 1, wherein the probability calculating circuitry selects a character candidate following a prefix that is an object of searching, based on a polynomial distribution in accordance with a co-occurrence probability of a character candidate following a prefix that is an object of searching.

3. The learning device according to claim 1, further comprising storage circuitry that stores the parameter of the speech recognition model updated in the updating.

4. The learning device according to claim 3, wherein the storage circuitry further stores the parameter set.

5. The learning device according to claim 1, wherein the error calculating circuitry obtains the degree of update of the parameter set by backpropagation starting from a gradient regarding a loss parameter to minimize loss in the summation of the word error rates at each character in a hypothetical character string using a set of smallest elements selected by a minimum operation that makes up a final word error count.

6. The learning device according to claim 1, wherein the probability calculating circuitry calculates the posterior probability of the recognition character string based on the speech features extracted by the extracting circuitry and the parameter set for the speech recognition model.

7. The learning device according to claim 4, wherein the probability calculating circuitry calculates the posterior probability of the recognition character string based on the speech features extracted by the extracting circuitry and the parameter set for the speech recognition model.

8. The learning device according to claim 1, wherein the probability calculating circuitry outputs a character string, of the plurality of hypothetical character strings, having a highest probability of calculated probabilities as recognition results.

9. The learning device according to claim 1, further comprising determining circuitry that determines whether the parameter set has converged or not.

10. The learning device according to claim 9, wherein in a case that the determining circuitry determines that the parameter set has converged, the updating circuitry stops updating of parameters of the speech recognition model.

11. The learning device according to claim 9, wherein in a case that the determining circuitry determines that the parameter set has not converged, the updating circuitry continues to update parameters of the speech recognition model.

12. A learning method executed by a learning device, the learning method comprising:
  extracting features of speech from speech data for training;
  based on the features of speech, performing prefix searching using a speech recognition model of which a neural network is representative, and calculating a posterior probability of a recognition character string to obtain a plurality of hypothetical character strings;
  calculating an error by word error rates of the plurality of hypothetical character strings and a correct character string for training;
  obtaining a degree of update of a parameter set for an entirety of the speeth recognition model by backpropagation, based on a loss in word rate and a policy gradient approximating a gradient of loss, the entirety of the speech recognition model minimizing an expected value of summation of loss in the word error rates; and
  updating a parameter of the speech recognition model in accordance with the degree of update of the parameter set obtained in the obtaining, wherein
  the policy gradient is defined by the following formula:

where
  $\Lambda$ is the parameter set,
  $J_{PG}$ is the summation of loss in word error rates,
  M is a total number of the plurality of hypothetical character strings,
  y is a hypothetical character string, and
  $h^{(m)}$(m=1, 2, . . . M) are the plurality of hypothetical character strings.

13. The learning method according to claim 12, further comprising storing the parameter of the speech recognition model updated in the updating.

14. The learning method according to claim 13, further comprising storing the parameter set.

15. The learning method according to claim 12, further comprising obtaining the degree of update of the parameter set by backpropagation starting from a gradient regarding a loss parameter to minimize loss in the summation of the word error rates at each character in a hypothetical character string using a set of smallest elements selected by a minimum operation that makes up a final word error count.

16. The learning method according to claim 12, further comprising calculating the posterior probability of the recognition character string based on the speech features extracted in the extracting and the parameter set for the speech recognition model.

17. The learning method according to claim 14, further comprising calculating the posterior probability of the recognition character string based on the speech features extracted in the extracting and the parameter set for the speech recognition model.

18. The learning method according to claim 12, further comprising outputting a character string, of the plurality of hypothetical character strings, having a highest probability of calculated probabilities as recognition results.

19. The learning method according to claim 12, further comprising determining whether the parameter set has converged or not.

20. A non-transitory computer readable medium storing computer executable instructions which, when executed by a computer, cause the computer to:
  extract features of speech from speech data for training;
  based on the features of speech, performing prefix searching using a speech recognition model of which a neural network is representative, and calculating a posterior probability of a recognition character string to obtain a plurality of hypothetical character strings;
  calculating an error by word error rates of the plurality of hypothetical character strings and a correct character string for training;
  obtaining a degree of update of a parameter set for an entirety of the speech recognition model by backpropagation, based on a loss in word error rate and a policy gradient approximating a gradient of loss, the entirety of the speech recognition model minimizing an expected value of summation of loss in the word error rates; and
  updating a parameter of the speech recognition model in accordance with the degree of update of the parameter set obtained in the obtaining, wherein
  the policy gradient is defined by the following formula;

$$\frac{\partial}{\partial \Lambda} J_{PG} = \frac{1}{M} \sum_{m=1}^{M} J_{PG}(\bar{y} = h^{(m)}),$$

$$\frac{\partial}{\partial \Lambda} J_{PG} = \frac{1}{M} \sum_{m=1}^{M} J_{PG}(\bar{y} = h^{(m)}),$$

where
- $\Lambda$ is the parameter set,
- $J_{PG}$ is the summation of loss in word error rates,
- M is a total number of the plurality of hypothetical character strings,
- y is a hypothetical character string, and
- $h^{(m)}$(m=1, 2, . . . M) are the plurality of hypothetical character strings.

* * * * *